United States Patent
Pi et al.

(10) Patent No.: US 7,680,499 B2
(45) Date of Patent: Mar. 16, 2010

(54) SYSTEM AND METHOD FOR MANAGING INCOMING CALL IN DUAL MODE PHONE

(75) Inventors: Lei Pi, Shenzhen (CN); Tsung-Fu Huang, Shenzhen (CN); Shu-Ken Lin, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 498 days.

(21) Appl. No.: 11/309,404

(22) Filed: Aug. 4, 2006

(65) Prior Publication Data

US 2007/0077932 A1 Apr. 5, 2007

(30) Foreign Application Priority Data

Sep. 16, 2005 (TW) .............................. 94132097 A

(51) Int. Cl.
*H04W 40/00* (2006.01)
(52) U.S. Cl. ................. 455/445; 455/426.1; 455/426.2; 455/552.1; 370/336
(58) Field of Classification Search ............. 455/552.1, 455/522, 101, 132, 445, 426.1–426.2, 428; 370/338, 328, 352, 395.52
See application file for complete search history.

(56) References Cited

U.S. PATENT DOCUMENTS

| 6,324,380 B1 | 11/2001 | Kiuchi et al. |
| 6,594,253 B1 | 7/2003 | Sallberg |
| 2005/0159153 A1* | 7/2005 | Mousseau et al. ........ 455/432.1 |
| 2006/0009213 A1* | 1/2006 | Sturniolo et al. ......... 455/426.1 |
| 2006/0025141 A1* | 2/2006 | Marsh et al. ................ 455/445 |
| 2007/0058637 A1* | 3/2007 | Lo ........................... 370/395.2 |
| 2007/0147316 A1* | 6/2007 | Khan et al. ................. 370/338 |
| 2008/0056208 A1* | 3/2008 | Hinrikus et al. ............. 370/338 |

FOREIGN PATENT DOCUMENTS

| CN | 1604661 A | 4/2005 |
| JP | 2000-224199 A | 8/2000 |
| TW | 319935 | 11/1997 |
| TW | 507436 | 10/2002 |
| TW | 1228904 | 3/2005 |
| TW | 1229538 | 3/2005 |
| WO | WO 2004/082219 A2 | 9/2004 |

* cited by examiner

*Primary Examiner*—Kamran Afshar
*Assistant Examiner*—Ezana Getachew
(74) *Attorney, Agent, or Firm*—Wei Te Chung

(57) ABSTRACT

A method for managing incoming calls for a dual mode phone, comprising steps of: receiving an incoming call from a terminal; processing the incoming call and generating a prompt message to notify a user of the dual mode phone of the incoming call; determining whether the user accepts the incoming call; determining whether the dual mode phone is idle, if the user accepts the incoming call; determining whether a type of the incoming call matches with a current call mode of the dual mode phone if the dual mode phone is idle; switching from the current call mode to another call mode matching with the call mode of the incoming call if the type of the incoming call does not match with the current call mode of the dual mode phone; and establishing communication between the terminal and the dual mode phone.

14 Claims, 3 Drawing Sheets

SYSTEM AND METHOD FOR MANAGING INCOMING CALL IN DUAL MODE PHONE

FIELD OF THE INVENTION

The invention relates to a system and a method for managing an incoming call, and particularly to a system and a method for managing an incoming call in a dual mode phone.

DESCRIPTION OF THE RELATED ART

With fast development of network communication, a traditional single mode phone may be gradually replaced by a dual mode phone. The dual mode phone is capable of selecting among different communication networks according to different requirements and environments. For example, when a user carrying the dual mode phone is in a network environment with poor signal strength, he or she may switch to another network with good signal strength to greatly improve his or her communication quality.

An incoming call of a conventional dual mode phone can be either at a setup stage or a communication stage. At the setup stage, the dual mode phone has received signals of an incoming call for further processing the call before communication is established. At the communication stage, the dual mode phone has received the incoming call to start communication with another terminal. However, a major problem of the dual mode phone is that when another incoming call from a different network arrives at the dual mode phone while one of the incoming calls is just at the setup stage before communication is successfully established, a conflict occurs. As a result, the incoming call from a different network is rejected and lost without any records saved in the dual mode phone.

SUMMARY OF THE INVENTION

An exemplary embodiment of the invention provides a system for managing an incoming call in a dual mode phone, comprising: a network interface, a signal processing module, a call managing module, and a call routing module. The network interface receives or transmits the incoming calls between the dual mode phone and a terminal sending the incoming call. The signal processing module processes the incoming calls to generate a prompt message to notify a user of the dual mode phone. The call managing module determines whether the dual mode phone is idle. The user interface determines whether the user accepts the incoming call. The call routing module determines whether a type of the incoming call matches with a current call mode, and if the type of the incoming call does not match the current call mode, the call routing module switches the current call mode of the dual mode phone to a call mode matching with the incoming call to establish a communication between the terminal and the dual mode phone.

An another exemplary embodiment of the invention provides a method for managing incoming calls in a dual mode phone. The method includes steps of: receiving an incoming call from a terminal; processing the incoming call to generate a prompt message to notify a user of the dual mode phone; determining whether the user accepts the incoming call; determining whether the dual mode phone is idle, if the user accepts the incoming call; determining whether a type of the incoming call matches with a current call mode of the dual mode phone if the dual mode phone is idle; switching from the current call mode to another call mode matching with the call mode of the incoming call if the type of the incoming call does not match with the current call mode of the dual mode phone; and establishing communication between the terminal and the dual mode phone.

Other advantages and novel features will become more apparent from the following detailed description of preferred embodiments when taken in conjunction with the accompanying drawings, in which:

DETAILED DESCRIPTION OF THE INVENTION

Figure 1:
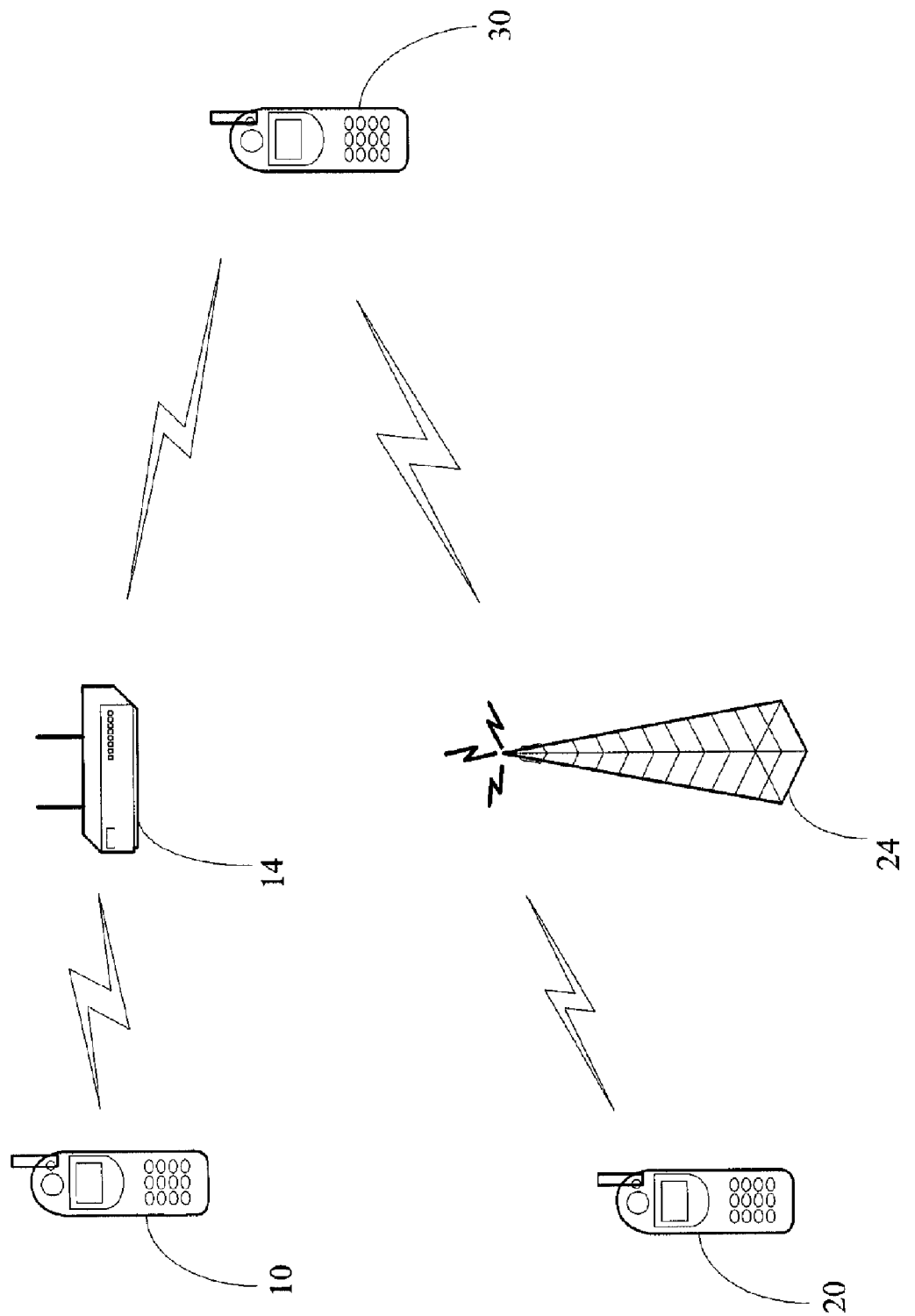
FIG. 1 is a schematic diagram illustrating an application environment of a system for managing an incoming call of a dual mode phone in an exemplary embodiment of the present invention.

FIG. 1 is a schematic diagram of an exemplary application environment of a system for managing incoming calls for a dual mode phone. In the exemplary embodiment, the dual mode phone 30 is operated in a first network or a second network. A call mode in the first network may be a voice over Internet protocol (VoIP) call mode or any other call mode. A call mode in the second network may be a global system for mobile communication (GSM) call mode or any other call mode. As shown in the FIG. 1, the dual mode phone 30 may establish communication with a first terminal 10 via a wireless station 14 in the VoIP call mode, or establish communication with a second terminal 20 via a GSM station 24 in the GSM call mode.

Figure 2:
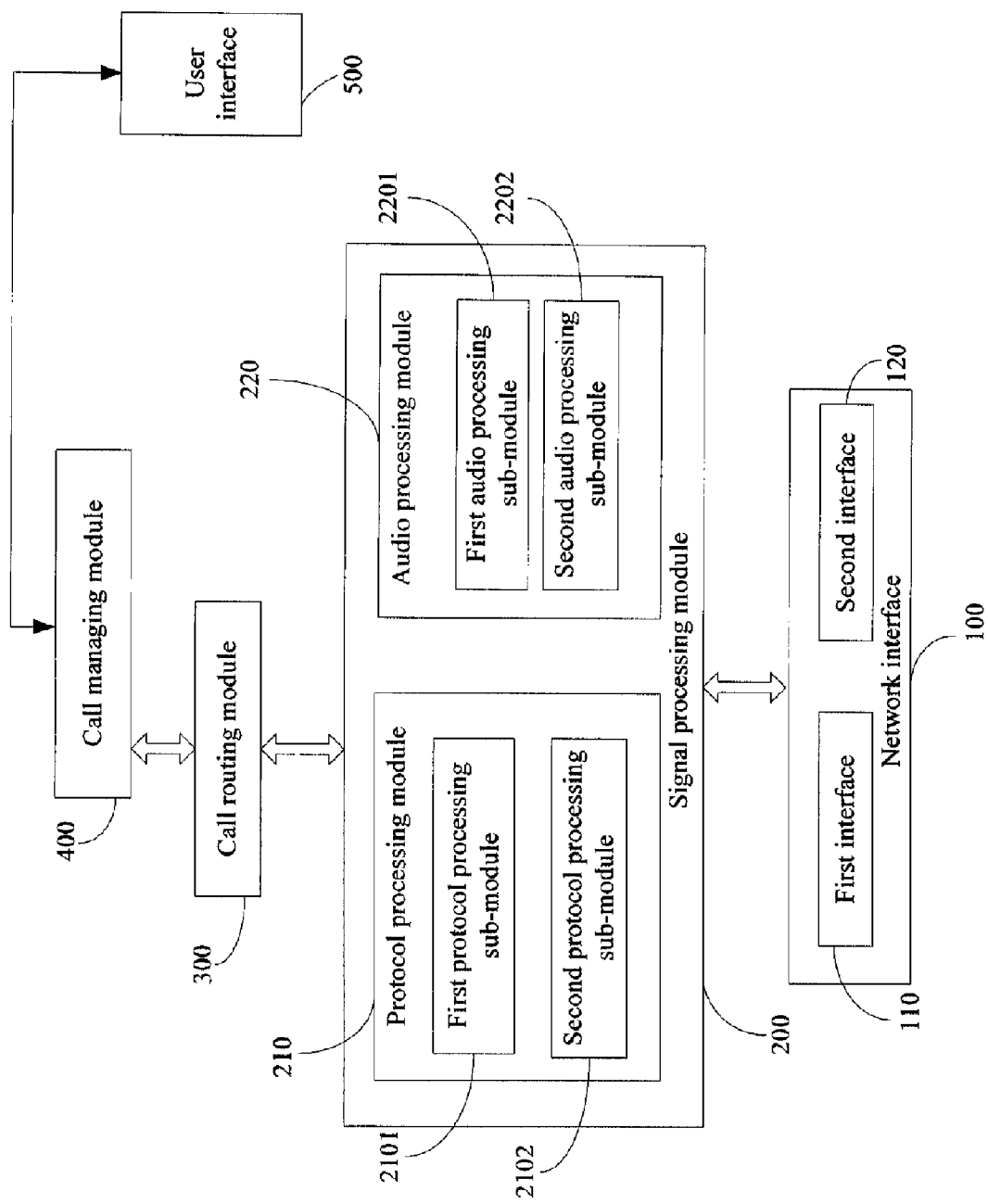
FIG. 2 is a schematic diagram of the system for managing an incoming call of a dual mode phone of FIG. 1.

FIG. 2 is a schematic diagram of a system for managing incoming calls of a dual mode phone of another exemplary embodiment of the present invention. The dual mode phone 30 is operated in two different networks, and since the dual mode phone 30 has a system for incoming call management of the invention, a communication conflict between two incoming calls from different network terminals is avoided. The system includes a network interface 100, a signal processing module 200, a call routing module 300, a call managing module 400, and a user interface 500.

The network interface 100 receives an incoming call from a VoIP network or a GSM network. In the exemplary embodiment, the incoming call includes a VoIP incoming call and a GSM incoming call.

The signal processing module 200 processes the incoming call to generate a prompt message to a user of the dual mode phone. The signal processing module 200 includes a protocol processing module 210 and an audio processing module 220.

The protocol processing module 210 includes a first protocol processing sub-module 2101 and a second protocol processing sub-module 2102 for processing different protocols of the incoming calls. In the exemplary embodiment, the first protocol processing sub-module 2101 may process a protocol of the VoIP incoming call; the second protocol processing module 2102 may process a protocol of the GSM incoming call.

The audio processing module 220 includes a first audio processing sub-module 2201 and a second audio processing sub-module 2202. In the exemplary embodiment, the first audio processing sub-module 2201 may be used for processing audio of the VoIP incoming call, the second audio processing sub-module 2202 may be used for processing audio of the GSM incoming call.

The call routing module 300 detects whether a type of the incoming call matches with a current call mode. If the type of the incoming call does not match with the current call mode, the call routing module 300 switches the current call mode of the dual mode phone 30 to a call mode matching with the incoming call to establish communication between the terminal 10 or the terminal 20 and the dual mode phone 30.

The call managing module 400 determines whether the dual mode phone is idle.

The user interface 500 receives the prompt message and determines whether the user of the dual mode phone accepts the incoming call.

When the first terminal 10 transmits the VoIP incoming call to the dual mode phone 30, or the second terminal 20 transmits the GSM incoming call to the dual mode phone 30, the network interface 100 receives either the VoIP incoming call or the GSM incoming call first. Then the network interface 100 transmits the incoming call to the signal processing module 200. The signal processing module 200 selects the first protocol processing sub-module 2101 or the second protocol processing sub-module 2102 according to the protocol type of the incoming call to process the incoming call and generates the prompt message. In the exemplary embodiment, the first protocol processing sub-module 2101 is a voice over Internet protocol (VoIP) processing module, the second protocol processing sub-module 2102 is a global system for mobile communication (GSM) protocol processing module. In other embodiments, the first protocol processing sub-module 2101 and the second protocol processing sub-module 2102 may be other different network type protocol processing modules.

After the signal processing module 200 generates the prompt message, the signal processing module 200 transmits the prompt message to the call managing module 400 via the call routing module 300. Then the call managing module 400 transmits the prompt message to the user interface 500 to notify the user of the dual mode phone, and the user interface 500 determines whether the user of the dual mode phone 30 accepts the incoming call.

In the exemplary embodiment, if the user accepts the incoming call, and the dual mode phone 30 is idle, then the call routing module 300 starts the signal processing module 200 to establish communication between the terminal 10 or the terminal 20 and the dual mode phone 30 directly.

If the user rejects the incoming call, then the user interface 500 transmits a reject order to the terminal 10 or 20 transmitting the incoming call, and saves the incoming call as a missed call.

If the user accepts the incoming call, and the dual mode phone 30 is not idle, for example, the dual mode phone 30 is receiving another call or in dialing mode, then the call routing module 300 determines whether the type of the incoming call matches with the current call mode of the dual mode phone 30. If the type of the incoming call does not match with the current call mode of the dual mode phone 30, then the call routing module 300 switches the current call mode of the dual mode phone 30 to match with the type of the incoming call. For example, if the incoming call is the VoIP incoming call, the current call mode of the dual mode phone 30 is GSM mode, then the call routing module 300 switches the call mode of the dual mode phone 30 from the current call mode (GSM mode) to another call mode (VoIP mode).

Figure 3:
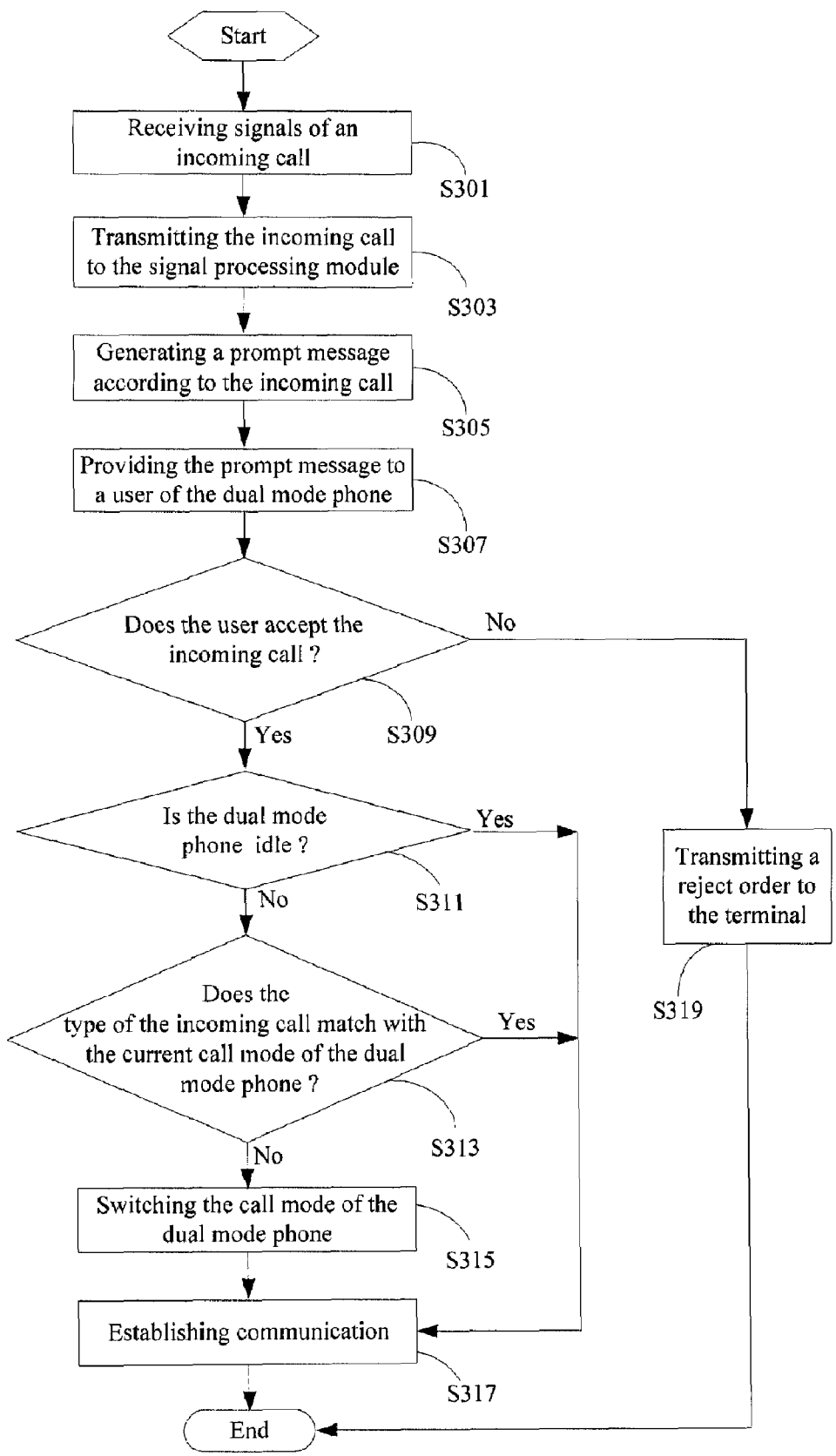
FIG. 3 is a flowchart of a method for managing incomings call of a dual mode phone of another exemplary embodiment of the present invention.

FIG. 3 is a flowchart for managing incoming calls for a dual mode phone of an exemplary embodiment of the present invention.

In step S301, the dual mode phone 30 receives signals of an incoming call via the first interface 110 or the second interface 120 of the network interface 100.

In step S303, the network interface 100 transmits the incoming call to the signal processing module 200. In the exemplary embodiment, the network interface 100 transmits the incoming call to the first protocol processing sub-module 2101 or the second protocol processing sub-module 2102 to process a protocol of the incoming call, and transmits an audio signal of the incoming call to the audio processing module 220 to process.

In step S305, the signal processing module 200 generates a prompt message according to the incoming call, and transmits the prompt message to the call managing module 400 via the call routing module 300.

In step S307, the call managing module 400 transmits the prompt message to the user interface 500, providing the prompt message to the user of the dual mode phone 30.

In step S309, the user interface 500 determines whether the user accepts the incoming call. If the user accepts the incoming call, the process proceeds to step S311 described below.

In step S311, the call manage module 400 determines whether the dual mode phone 30 is idle. If the dual mode phone 30 is not idle, then the process proceeds to step S313 described below.

In step S313, the call routing module 300 determines whether the type of the incoming call matches with the current call mode of the dual mode phone 30. If the type of the incoming call does not match with the current call mode of the dual mode phone 30, then the process proceeds to step S315. If the type of the incoming call matches with the current call mode of the dual mode phone 30, the process proceeds to step S317.

In step S315, the call routing module 300 switches the current call mode of the dual mode phone 30 to match with the type of the incoming call. In the exemplary embodiment, the call routing module 300 selects the protocol processing module 210 and the audio processing module 220 correspondingly to switch the current call mode of the dual mode phone 30.

In step S317, communication between the terminal 10 or 20 and the dual mode phone 30 is established.

If the user rejects the incoming call in step S309, then the process proceeds to step S319, the user interface 500 transmits a reject order to the terminal 10 or 20 and saves the incoming call as a missed call.

In step S311, if the dual mode is idle, then the process proceeds to step S317 directly.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A system for managing incoming calls in a dual mode phone, comprising:
   a network interface for receiving or transmitting the incoming calls between the dual mode phone and a terminal sending the incoming calls;
   a signal processing module for processing the incoming calls and generating a prompt message to notify a user of the dual mode phone of an incoming call;

a call managing module for determining whether the dual mode phone is idle;

a user interface for determining whether the user accepts the incoming call; and a call routing module for determining whether a type of the incoming call matches with a current call mode, and if the type of the incoming call does not match with the current call mode, the call routing module switching the current call mode of the dual mode phone to a call mode matching with the type of the incoming call to establish communication between the sending terminal and the dual mode phone.

2. The system as claimed in claim 1, wherein the network interface comprises a first interface and a second interface for receiving different incoming calls, respectively.

3. The system as claimed in claim 2, wherein the first interface is a Voice over Internet Protocol (VoIP) interface.

4. The system as claimed in claim 3, wherein the second interface is a Global System for Mobile Communications (GSM) interface.

5. The system as claimed in claim 1, wherein the signal processing module comprises a protocol processing module for processing protocols of the incoming calls and an audio processing module for processing audio signals of the incoming calls.

6. The system as claimed in claim 5, wherein the protocol processing module comprises:

a first protocol processing sub-module for processing a protocol of the incoming call based on Voice over Internet Protocol (VoIP); and a second protocol processing sub-module for processing a protocol of the incoming call based on Global System for Mobile Communications (GSM).

7. The system as claimed in claim 5, wherein the audio processing module comprises:

a first audio sub-module for processing an audio signal of the incoming call based on Voice over Internet Protocol; and a second audio sub-module for processing an audio signal of the incoming call based on Global System for Mobile Communications.

8. A method for managing incoming calls for a dual mode phone, comprising steps of:

receiving signals of an incoming call from a terminal;

processing the incoming call to generate a prompt message to notify a user of the dual mode phone of the incoming call;

determining whether the user accepts the incoming call;

determining whether the dual mode phone is idle by a signal processing module of the dual mode phone, if the user accepts the incoming call;

determining whether a type of the incoming call matches with a current call mode of the dual mode phone if the dual mode phone is not idle;

switching from the current call mode to another call mode matching with the type of the incoming call if the type of the incoming call does not match with the current call mode of the dual mode phone; and establishing communication between the terminal and the dual mode phone.

9. The method as claimed in claim 8, further comprising rejecting the incoming call if the user does not accept the incoming call.

10. The method as claimed in claim 8, further comprising establishing communication between the dual mode phone and the terminal directly if the dual mode phone is idle.

11. The method as claimed in claim 8, wherein the communication between the dual mode phone and the terminal is established directly if the type of the incoming call matches with the current call mode of the dual mode phone.

12. The method as claimed in claim 8, wherein the step of switching from the current call mode to another call mode further comprises selecting a protocol processing module and an audio processing module correspondingly.

13. The method as claimed in claim 8, wherein the call mode of the dual mode phone comprises a VoIP call mode and a GSM call mode.

14. The method as claimed in claim 13, wherein the incoming call comprises a VoIP incoming call and a GSM incoming call.

* * * * *